July 21, 1942.　　　E. A. SPRINGER　　　2,290,362
FLASHLIGHT PHOTOGRAPHIC SHUTTER
Filed Oct. 4, 1941
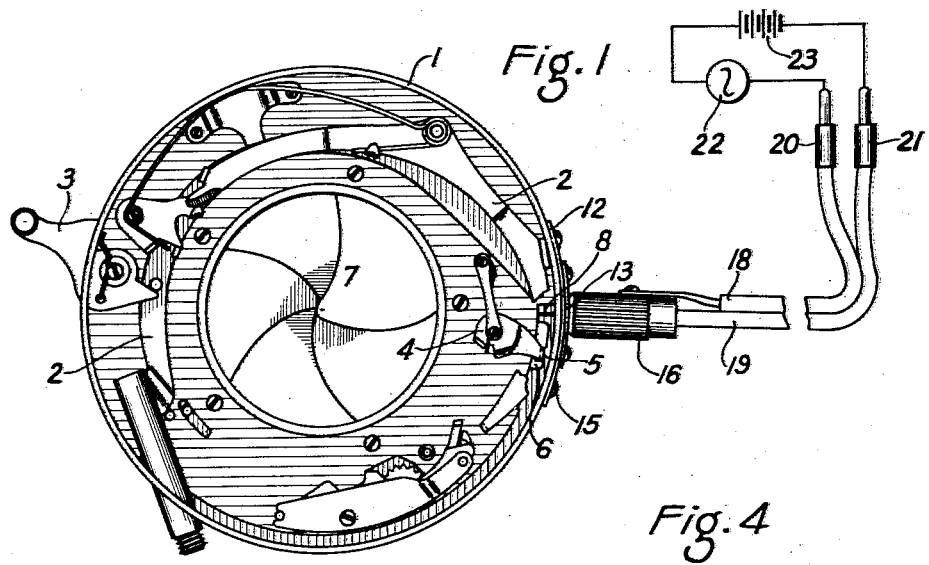
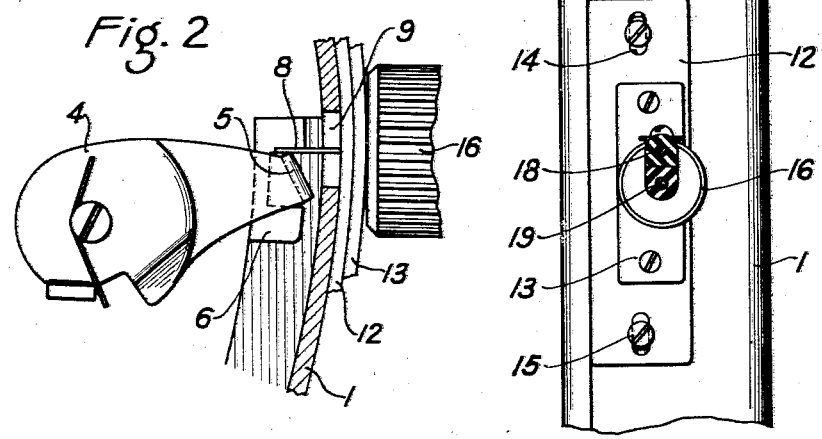
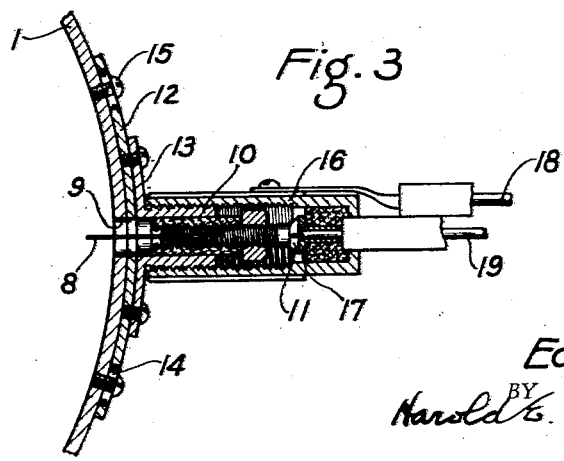
INVENTOR
Edward A. Springer
BY Harold E. Stonebraker
ATTORNEY Patented July 21, 1942

2,290,362

UNITED STATES PATENT OFFICE 2,290,362

FLASHLIGHT PHOTOGRAPHIC SHUTTER

Edward A. Springer, Irondequoit, N. Y., assignor to Wollensak Optical Company, Rochester, N. Y., a corporation of New York Application October 4, 1941, Serial No. 413,595

2 Claims. (Cl. 67—29)

This invention relates to a flashlight photographic shutter, and has for its object to afford a simple, practical, and economical construction in which the shutter is operated in the conventional fashion as for daylight exposures, and serves effectively to operate a flashlight in accurately and closely timed relationship to the opening of the shutter.

More particularly, the invention has for its purpose to afford a photographic shutter in which the shutter blade actuator forms a part of an electric circuit controlling a lamp and operating to close the lamp circuit when the shutter blade actuator reaches a predetermined point and engages a contact in its path, the shutter mechanism being in the electric circuit and therefore enabling a closer adjustment and more accurately timed relation between the opening of the shutter and the operation of the lamp.

Another object of the invention is to afford an arrangement particularly adaptable to manually operated large shutters which do not lend themselves to successful operation by conventional mechanisms designed for synchronous actuation of a shutter and flashlight, the present mechanism being adapted to a conventional shutter without disturbing or affecting its usual parts and operating to cause closing of a flashlight circuit automatically at a predetermined point in the path of travel of the shutter blade actuator and produce the light at the exact instant when the shutter reaches its maximum open position.

A further purpose of the invention is to provide a structure in which a contact may be quickly and easily adjusted by the operator to fix to a nicety the exact point in the travel of the shutter blade actuator at which the lamp circuit is closed in order to compensate for any variables in the lamps used and to insure flashing the light at exactly the proper instant, while at the same time the shutter blade actuator is free to move to the limit of its travel and such complete movement is not impeded or appreciably slowed by its engagement with the contact in its path.

Another purpose of the invention is to eliminate a complicated synchronizing mechanism such as conventionally employed for operating a shutter and lamp, and to afford a structure in which the shutter mechanism can be operated in the usual fashion and will efficiently control the flashlight operation at the proper instant, affording a practical structure for a large, heavy shutter, operated by a trigger having a long stroke or requiring considerable power for its operation, for which the conventional types of synchronizing mechanism are not adaptable or practical.

Still an additional object of the invention is to provide a structure that requires no difficult and complicated adjustment to time the lighting operation in correct synchronism with the shutter, but which enables any operator to determine and make the necessary adjustment quickly and readily, to insure proper timing of the light.

To these and other ends, the invention consists in the construction and arrangement of parts that will appear clearly from the following description when read in conjunction with the accompanying drawing, the novel features being pointed out in the claims following the specification.

In the drawing:

Fig. 1 is a plan view, generally diagrammatic, of a conventional shutter showing the application of one embodiment of the invention;

Fig. 2 is an enlarged detail view showing the shutter blade actuator when moved to circuit-closing position;

Fig. 3 is a transverse sectional view, and

Fig. 4 is a side elevation.

Referring more particularly to the drawing in which like reference numerals refer to the same parts throughout the several views, I designates the housing of a conventional photographic shutter including a pivoted master lever 2 that is moved when the trigger 3 is operated, and thereupon engages and moves the shutter blade actuator 4, which is pivotally mounted and retained in normal position to hold the shutter closed by suitable spring means. The shutter actuator 4 includes a depending portion 5 that cooperates in a conventional manner with the shutter blade ring 6, so as to open and close the shutter blades 7 when the shutter blade actuator 4 is moved by the master lever 2.

The parts thus far described are old, and the present invention has to do with additional mechanism forming a part of the shutter structure and acting, when the shutter blade actuator reaches a predetermined point, to close an electric circuit controlling a flashlight. To accomplish this, there is provided a contact 8, preferably in the form of a yieldable spring finger, extending through an opening 9 in the side wall of the housing and located in the path of the portion 5 of the shutter blade actuator 4.

The contact finger 8 is mounted in an exteriorly threaded support 10 and insulated therefrom while provided at its outer end with a conducting terminal 11. The support 10 is suitably mounted on a bracket or plate 12, and to this end may be provided with lugs 13 secured to the plate 12, which latter is slotted at 14 and held in place exteriorly of the housing by the fastening screws 15. By loosening screws 15 and sliding the bracket or plate 12 peripherally of the housing, the contact finger 8 may be adjusted laterally of the opening 9 so as to vary the point at which the shutter blade actuator engages it and closes the electrical circuit.

This adjustment can be quickly and easily made by any operator, and compensates for any lag in the lighting of the lamp after the circuit is closed, so as to coordinate accurately the lighting operation with the maximum open position of the shutter. To effect this timing properly, it may sometimes be necessary for the shutter blade actuator to engage the spring contact member before reaching the limit of its movement, and this is permitted by the yieldability of the spring contact member which will easily flex sufficiently to permit the shutter blade actuator to complete its full path of travel, without impeding or appreciably slowing its movement.

Connection is made to the lamp circuit in any suitable manner, and this is preferably accomplished by a detachable threaded connector or sleeve 16 that is connected to one side of the line and completes the circuit through the support 10, the housing, and the shutter mechanism, while 17 designates a terminal carried by the sleeve 16 and connected to the other side of the line, so as to close the circuit through terminal 11 by contact therewith when the connector or sleeve 16 is threaded on to the support 10. The sleeve 16 and terminal 17 are connected to the conductors 18 and 19 respectively, which may be provided with connectors 20 and 21 that may be plugged into sockets of a suitable lighting unit comprising a lamp 22 and battery 23. The sleeve 16 may be otherwise connected to the lighting circuit in any convenient fashion, or the terminal 11 and support 10 may be permanent parts of the electric circuit is preferred, eliminating the necessity of the detachable connector or sleeve 16.

With this structure, the shutter can be used in the conventional manner for daylight exposures, and if flashlight operations are desired, it is only necessary to secure the threaded connector on the support 10, and plug connectors 20 and 21 into the lighting unit. When the shutter is operated in the usual fashion by manipulating the trigger, the shutter blade actuator is moved to open the shutter, and during the path of travel of the shutter blade actuator at the limit of such movement or before reaching the limit of its movement, it engages the spring contact finger 8, closing the circuit and causing the flashlight to be operated at the instant when the shutter reaches its maximum open position.

While the invention has been described with reference to certain structural details, it is not confined to the precise disclosure of this application, which is intended to cover any modifications or departures coming within the purposes of the improvement or the scope of the following claims.

I claim:

1. In a photographic shutter, the combination with a shutter blade ring and a pivoted shutter blade actuator having its outer end connected to said ring and operating to move the ring in opposite directions to open and close the shutter, and a master lever operatively associated with the actuator, of a lamp circuit including a yieldable spring contact finger having its free inner end located in the path of and extending at right angles to the path of movement of the outer end of the shutter blade actuator when the latter is near the limit of its shutter opening travel, the free end of the contact finger being capable of flexing in the direction of movement of the shutter blade actuator without affecting the speed of the travel of the latter, a housing having an opening through which said contact finger extends, and a support for said contact finger located entirely outside said opening and the housing and adjustable on the outer periphery of the housing in the direction of movement of the shutter blade actuator.

2. In a photographic shutter, the combination with a shutter blade ring and a pivoted shutter blade actuator having its outer end connected to said ring and operating to move the ring in opposite directions to open and close the shutter, and a master lever operatively associated with the actuator, of a lamp circuit including a yieldable spring contact finger having its free inner end located in the path of and extending at right angles to the path of movement of the outer end of the shutter blade actuator when the latter is near the limit of its shutter opening travel, the free end of the contact finger being capable of flexing in the direction of movement of the shutter blade actuator without affecting the speed of the travel of the latter, a housing having an opening in its side wall, said spring contact finger extending through said opening in the housing and inwardly beyond the side wall, and an insulated support for said spring contact finger located entirely outside said opening and the housing and adjustable on the outer periphery of the housing in the direction of travel of the shutter blade actuator, the spring contact finger being adjustable a distance corresponding to the size of the opening in the housing.

EDWARD A. SPRINGER.